United States Patent
Kryze et al.

(10) Patent No.: US 7,889,175 B2
(45) Date of Patent: Feb. 15, 2011

(54) TOUCHPAD-ENABLED REMOTE CONTROLLER AND USER INTERACTION METHODS

(75) Inventors: David Kryze, Campbell, CA (US); Philippe Morin, Goleta, CA (US); Masaki Yamauchi, Mountain View, CA (US); Luca Rigazio, San Jose, CA (US)

(73) Assignee: Panasonic Corporation, Osaka (JP)

( * ) Notice: Subject to any disclaimer, the term of this patent is extended or adjusted under 35 U.S.C. 154(b) by 512 days.

(21) Appl. No.: 11/977,348

(22) Filed: Oct. 24, 2007

(65) Prior Publication Data
US 2009/0002217 A1  Jan. 1, 2009

Related U.S. Application Data

(60) Provisional application No. 60/946,804, filed on Jun. 28, 2007.

(51) Int. Cl.
G09G 5/00 (2006.01)
(52) U.S. Cl. .................. 345/156; 345/169; 345/173
(58) Field of Classification Search .............. 345/156, 345/158, 168, 169, 173
See application file for complete search history.

(56) References Cited

U.S. PATENT DOCUMENTS

| | | | |
|---|---|---|---|
| 5,469,194 A | | 11/1995 | Clark et al. |
| 5,602,982 A | * | 2/1997 | Judd et al. .................. 715/709 |
| 5,652,630 A | | 7/1997 | Bertram et al. |
| 5,724,106 A | | 3/1998 | Autry et al. |
| 5,774,571 A | | 6/1998 | Marshall |
| 6,346,891 B1 | | 2/2002 | Feinleib et al. |
| 6,396,523 B1 | | 5/2002 | Segal et al. |
| 6,407,779 B1 | * | 6/2002 | Herz .......................... 348/734 |
| 6,429,543 B1 | | 8/2002 | Desai |
| 6,456,275 B1 | | 9/2002 | Hinckley et al. |
| 6,501,515 B1 | | 12/2002 | Iwamura |
| 6,765,557 B1 | | 7/2004 | Segal et al. |
| 6,908,386 B2 | * | 6/2005 | Suzuki et al. ................. 463/30 |
| RE39,059 E | * | 4/2006 | Foster ......................... 715/744 |
| 7,094,147 B2 | * | 8/2006 | Nakata et al. .................. 463/9 |
| 7,139,983 B2 | | 11/2006 | Kelts |
| 2003/0156756 A1 | | 8/2003 | Gokturk et al. |
| 2004/0196270 A1 | | 10/2004 | Chiu et al. |
| 2004/0236699 A1 | | 11/2004 | Beenau et al. |
| 2005/0162402 A1 | | 7/2005 | Watanachote |
| 2005/0185788 A1 | | 8/2005 | Daw |
| 2005/0210419 A1 | | 9/2005 | Kela et al. |
| 2005/0259086 A1 | | 11/2005 | Chiu et al. |
| 2006/0197753 A1 | | 9/2006 | Hotelling |
| 2006/0227030 A1 | | 10/2006 | Clifford et al. |
| 2007/0265104 A1 | | 11/2007 | Haga et al. |

* cited by examiner

Primary Examiner—Stephen G Sherman
(74) Attorney, Agent, or Firm—Harness, Dickey & Pierce, P.L.C.

(57) ABSTRACT

The handheld case of the remote control unit includes at least one touchpad, and other sensors, such as acceleration sensors, case perimeter sensors, pressure sensors, RF signal sensors. These sensors provide a rich array of sensory inputs that are classified by a pattern recognizer to generate control commands for both the consumer electronic equipment and the remote control unit itself. A power management system to conserve unit battery power is also responsive to the pattern recognizer to allow intelligent power management control. The control system uses the display of the consumer electronic equipment to provide instructions to the user, and the behavior of the remote control system uses what is displayed on the display as context information for pattern recognition.

4 Claims, 3 Drawing Sheets

TOUCHPAD-ENABLED REMOTE CONTROLLER AND USER INTERACTION METHODS

CROSS-REFERENCE TO RELATED APPLICATIONS

This application claims the benefit of U.S. Provisional Application No. 60/946,804, filed on Jun. 28, 2007. The disclosure of the above application is incorporated herein by reference.

BACKGROUND

Practically all consumer electronic products in use today come with a remote control. In most cases, the remote control has many buttons, each dedicated to the control of one or more specific features of the consumer electronics product. As these products increase in complexity, so does the number of buttons required. At some point, the increased number of buttons renders the remote control mostly useless for a large number of users.

The present invention takes a fresh look at the remote control of consumer electronic products. It replaces the large number of buttons with a simple handheld remote control unit that includes at least one touchpad together with a rich array of additional sensors, such as acceleration sensors, case perimeter sensors, pressure sensors, RF signal sensors, and the like. The remote control system responds to signals from this rich array of sensors using pattern recognition technology that allows the system to control many complex functions within consumer electronic equipment based on the manipulation and gestural movement of the remote control by the user. The pattern recognition system is adaptive. It can identify different users by the manner in which the remote control system is utilized and it can adapt so that each user can manipulate the system in his or her own unique way, and still effect control over the various functions of the consumer electronic equipment.

The remote control unit, itself, can also respond to the sensory input "meaning" to alter the manner in which the remote control unit behaves. In this way, visual, audible or tactile cues, as well as power conservation strategies, can be controlled and revised based on the sensory input data.

For a more complete understanding of the invention, refer to the following description and to the accompanying drawings.

BRIEF DESCRIPTION OF THE DRAWINGS

FIG. 1a is a perspective view of the remote control unit;

FIG. 1b is a plan view of the remote control unit;

DESCRIPTION OF THE PREFERRED EMBODIMENTS

Figure 1C:
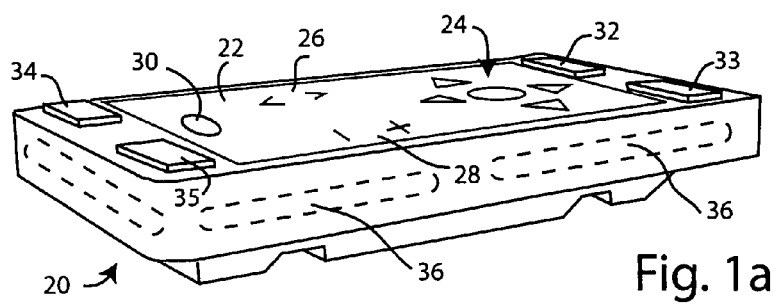
FIG. 1c is a view of the remote control unit in a portrait orientation.
Figure 1C:
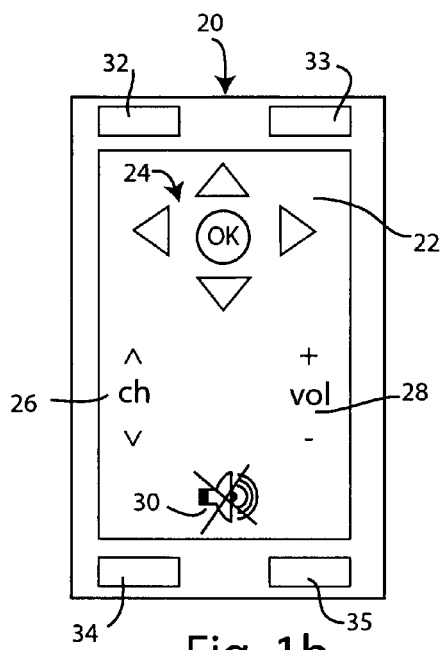
Figure 1C:
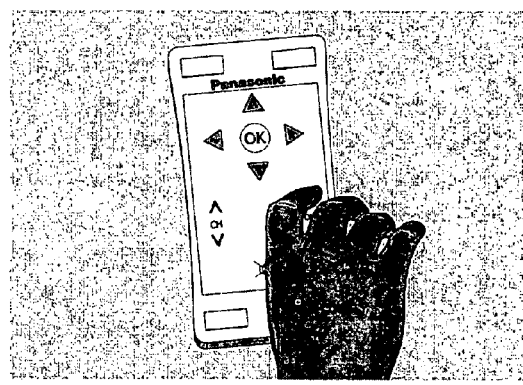

Referring first to FIGS. 1a and 1b, the remote control unit 20 of the remote control system has been illustrated. This remote control unit interacts with a control circuit that is coupled to the consumer electronic equipment. The control circuit and consumer electronic equipment have not been showed in FIGS. 1a-1d but are shown in subsequent FIGS. 2 and 3.

The remote control unit 20 has a touchpad 22 that may include predefined clickable regions, such as the up-down-left-right-okay region 24, the channel up-down region 26, the volume up-down region 28 and the mute region 30. It will be understood that these predefined clickable regions are merely exemplary of the basic concept that the touch screen can have regions that respond to pressure as a way of signifying that the user has "selected" a particular function. While the basic design of the remote control unit strives to eliminate physical push buttons to a large extent, the remote control unit may still have physical push buttons if desired. Thus, for illustration purposed, four push buttons are shown at 32, 33, 34 and 35. It is also contemplated that the touchpad may be split into two distinct zones with or without a physical divider interposed between the two zones.

The pre-defined clickable regions may be visually designated on the touchpad surface by either silk screening the region graphics onto the surface of the touchpad, or by using a see-through graphic with backlighting. As will be more fully discussed below, the backlighting can be triggered by the appropriate combination of sensory inputs as recognized by the pattern recognizer also discussed below. It is contemplated that the touchpad surface may not include any pre-defined clickable regions.

The case of the remote control unit is preferably provided with a series of capacitive sensors, such as sensors 36 around the horizontal side walls of the case perimeter. Capacitive sensors can also be at other locations, such as on the underside of the case. These sensors detect how the user is holding the remote control. In this regard, different users may grip the remote control in different ways and the capacitive sensors are arranged to be able to discriminate these different ways of holding the remote control. Although there may be subtle differences in how one user holds the remote control as compared with another, the pattern recognition system, discussed below, can use this information to recognize these subtle differences. Moreover, the sensors in cooperation with the pattern recognition system enable a user to operate the remote independently of how the remote is being held.

Figure 2:
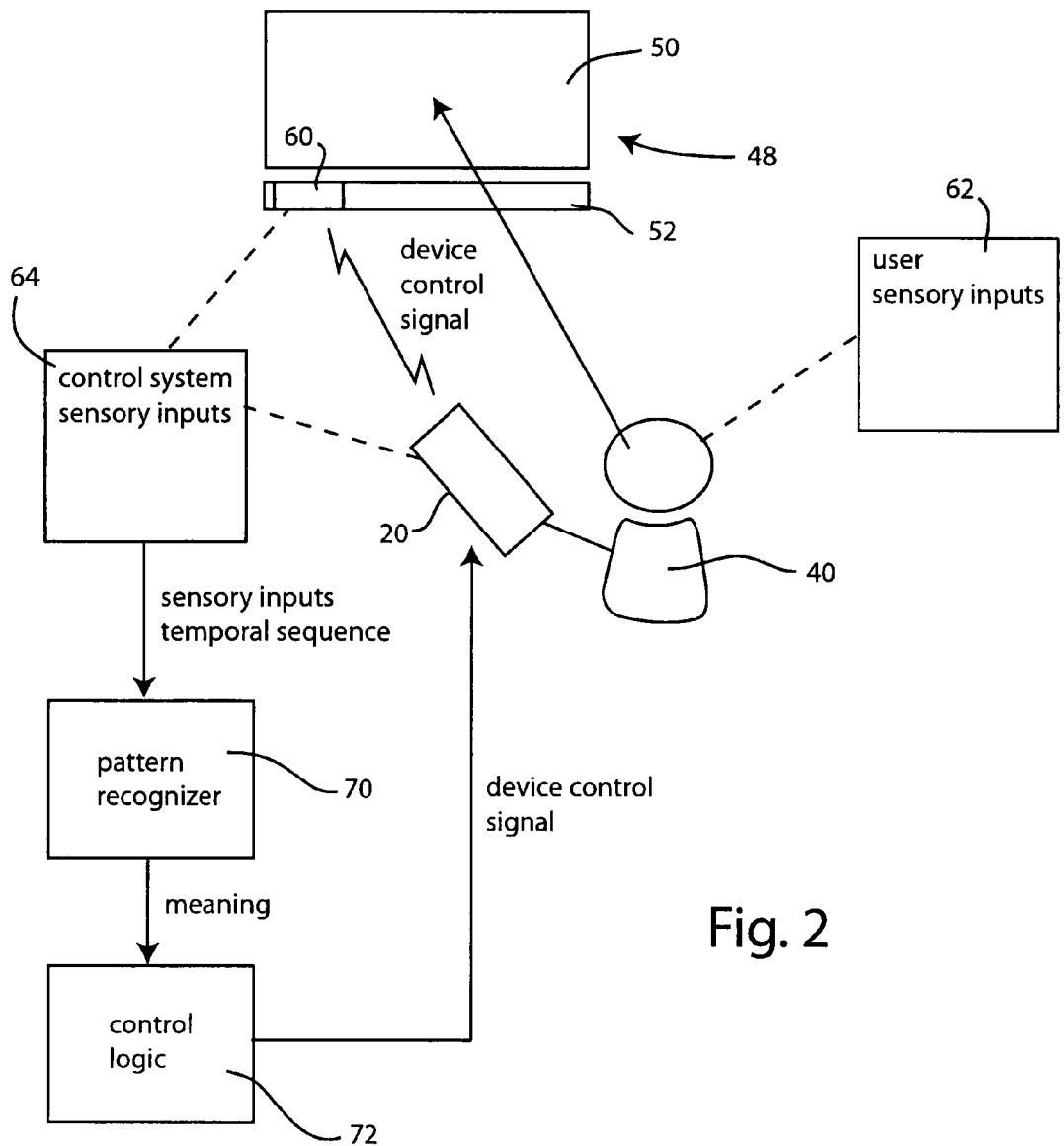
FIG. 2 is a system block diagram illustrating the remote control system in operation by a user to control a piece of consumer electronic equipment.

Referring now to FIG. 2, an overview of the pattern recognition system will be presented. FIG. 2 illustrates the remote control unit 20 being manipulated by a user 40 to operate a consumer electronic equipment component 48 having a display screen 50. The consumer electronic equipment 48 conventionally has its own electronics that are used to provide the equipment with its normal functionality. In the case of the illustrated component 48 such functionality includes displaying audio visual material on the display screen. This material may include, for example, television programs, pre-recorded content, internet content and the like. For illustration purposes, the associated electronics of the consumer electronic equipment 48 have been illustrated separately at 52. Embedded within the electronics package 52 is a control circuit shown diagrammatically at 60 that defines part of the remote control system. Control circuit 60 is coupled to the consumer electronic equipment and responds to commands sent from the remote control unit 20 to control the operation of the consumer electronic equipment.

The remote control system is made up of the remote control 20 and the control circuit 60. Together, these two components implement a sophisticated sensory input detecting and pattern recognizing system that allows the user 40 to control operations of the consumer electronic equipment 50 using a rich variety of finger, hand, wrist, arm and body movements. The system may be viewed as effecting a dialogue between the remote control unit 20 and the control circuit 60, where that dialogue is expressed using a vocabulary and grammar associated with a diverse variety of different sensory inputs, (e.g., from the touchpad, accelerometer, case perimeter, sensor, pressure sensors, RF signal sensors and the like). The control system also includes a feedback loop through the user 40. The user 40 has his or her own set of user sensory inputs (sight, sound, touch) and the user manipulates the remote control unit 20 based, in part, on audible and visual information obtained from the consumer electronic equipment, and on visual, audible and tactile information from the remote control unit. Thus, the remote control system supports a dialogue between remote control unit 20 and control circuit 60, with a concurrent dialogue between user 40, the control system and the consumer electronic equipment.

FIG. 2 thus illustrates that user 40 may receive visual, audible or tactile feedback from remote control 20 and this may be performed concurrently while viewing the display screen 50. For illustration purposes, the information acquired by user 40 are depicted diagrammatically as user sensory inputs 62. Likewise, the sensory inputs acquired by the control system (from a diverse array of different types of sensors) has been diagrammatically illustrated at 64.

The relationship between the control system sensory inputs 64 and the user sensory inputs 62 is a non-trivial one. The user will manipulate the remote control unit 20, in part, based on what the user is trying to accomplish and also, in part, based on what the user sees on the display 50 and what the user also senses audibly, visually or tactilely from the remote control unit and/or consumer electronic equipment. To illustrate this point, imagine that the consumer electronic equipment is a television set that has been programmed to block certain channels from being viewed by young children. In order to bypass the parental blocking feature, user 40 must manipulate the remote control unit in a predefined way. To prevent the child from simply watching the parent and learning the manipulating technique, the parental blocking unlocking feature can be changed each time it is used. The adult user must watch what is shown on the display screen in order to learn how to manipulate the control unit to unlock the parental blocking feature. The instructions on the display are presented in a form, such as textual instructions, that a young child is not able to read. Thus, the control of the parental blocking feature relies on a particular manipulation (e.g., flick the wrist three times) that is context-based. A later unlocking operation would be treated as a different context and would potentially have a different gestural command to effect unlocking. Although this is but one example the example illustrates that the behavior of the remote control system is context-dependent and that the user's sensory perception (e.g., reading the screen, feeling tactile vibrations, hearing particular sounds) will affect how the user's manipulations of the remote control unit are interpreted.

The control system is able to make sense of a rich and diverse collection of sensory inputs using a pattern recognizer 70 and associated control logic 72. As the user manipulates the remote control unit, sensory inputs are collected as a temporal sequence from the various sensors within the remote control unit. As previously noted, the sensors may include at least one touchpad responsive to manipulation by a user's fingers and at least one additional sensor such as, for example, an acceleration sensor responsive to movement of the remote control unit, case perimeter sensors such as capacitive sensors that discriminate which parts of the case are in contact with the user's body, pressure sensors responsive to pressing forces upon a predetermined region of the touchpad and RF signal sensors responsive to radio frequency signals transmitted from the control circuit 60.

The temporal sequence of sensory inputs is fed to the pattern recognizer 70. The pattern recognizer is configured to classify the received sensory input message according to a predetermined recognition scheme to generate message meaning data that are then sent to the control logic 72. The control logic 72 decodes the message meaning data and generates a device control signal. The device control signal may be supplied to the remote control unit itself, to effect control over the behavior of the remote control unit (e.g., putting the unit to sleep or waking the unit up) or the device control signal may be sent to and/or used by the control circuit 60, where it is passed on to the consumer electronic equipment as a command to control the operation of the consumer electronic equipment. The pattern recognizer 70 and the control logic 72 may be implemented separately or together and may be deployed in the control circuit 60, in the remote control 20, or distributed across both.

Figure 1D:
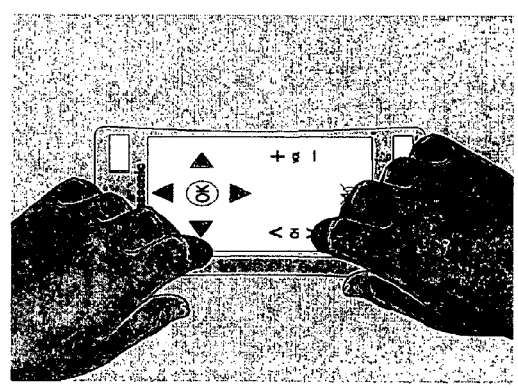
FIG. 1d is a view of the remote control unit in a landscape orientation.

In one embodiment, the pattern recognizer 70 employs a trained model that may be adaptively altered or customized to more closely fit each user's style of using the remote control unit. In such trained model embodiment, the pattern recognizer 70 is preferably provided with an initial set of models that classify certain operations as being mapped onto certain commands or control functions. For example, with reference to FIG. 1b, an upward sliding motion of the fingertip on channel up-down region 26 might launch a forward channel scanning mode, whereas a single click or finger press upon the upward arrow of the region 26 would simply increment the channel by one. This behavior might be classified differently, however, if the remote control unit is positioned in landscape orientation as illustrated in FIG. 1d. For example, when in landscape orientation and held by two hands (as determined by the capacitive sensors), the channel up-down region 26 might perform a function entirely unrelated to channel selection.

To adapt the model for a particular user, the preferred embodiment includes a sensory input mechanism to allow the user to inject a meta command—to let the system know that the user wishes to alter the pattern recognition models either for himself or herself, or for all users. For example, a rapid back and forth wrist motion (analogous to shaking one's head in a "no" gesture) might be used to inform the recognition system that the most recent pattern recognition conclusion was wrong and that a different behavior is desired. For example, assume that the user has used the remote control unit on a coffee table and then manipulates the channel up-down region 26, causing the television to begin a channel-scanning mode. Perhaps the user would prefer that the channel scanning mode should not be initiated when the remote control unit is resting on the coffee table (i.e., not being held). To change this behavior, the user would pick up the remote control unit and shake it back and forth in a "no" gesture. This would cause an on-screen prompt to appear on the television display 50, instructing the user how the most recent temporal sequence of sensory inputs can be modified in this context to result in a different device control signal outcome.

Because the pattern recognizer 70 can respond to a rich variety of different types of sensory inputs, the control system is able to interpret the meaning of user manipulations and gestures that can be quite complex, thereby allowing the user to interact in an intuitive or natural way that can be customized from user to user. In this regard, there may be instances where two or more gestural commands might be very similar and yet might have different meanings and thus might require different commands to be sent to the consumer electronic equipment. To handle this, the pattern recognizer 70 may be based on a statistical model where the control system sensory inputs generate probability scores associated with a plurality of different meanings. The pattern recognizer would (a) select the meaning with the highest score, if that score is above a predetermined probability threshold value and/or above the next-most value by a predetermined threshold, or (b) engage the user in a dialogue on-screen to resolve which meaning was intended, if the preceding threshold conditions are not met. The results of such user interaction may then be used to fine tune or adapt the model so that the system learns what behavior is expected for subsequent use.

Figure 3:
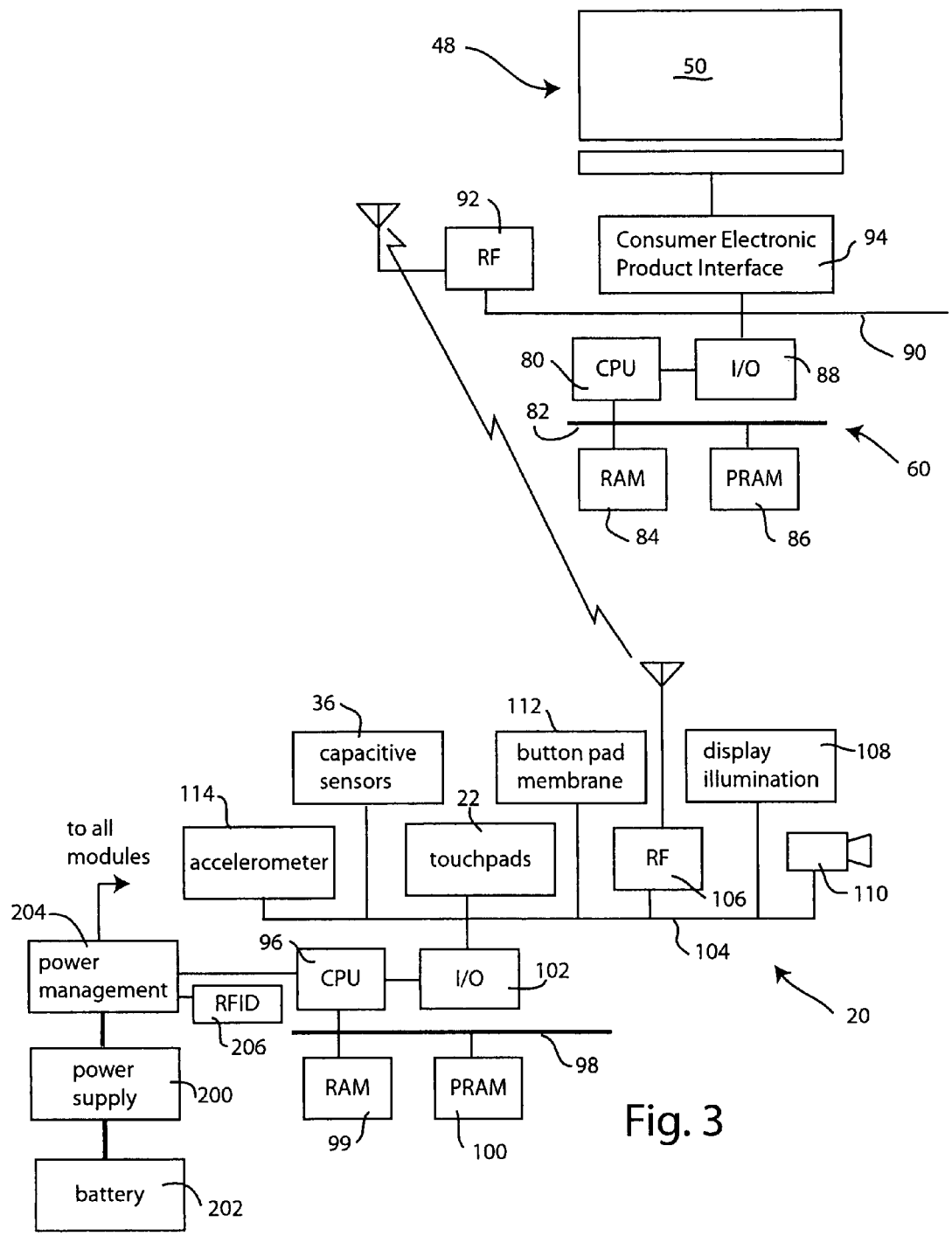
FIG. 3 is a block diagram illustrating an exemplary embodiment of the remote control system, including components associated with the control circuit coupled to the consumer electronic equipment and associated with the remote control unit.

With the above overview in mind, refer now to FIG. 3 where a detailed description of the remote control unit and control circuit hardware has been illustrated. In FIG. 3, the components associated with the control circuit are shown generally at 60 and the components associated with the remote control unit are shown generally at 20. The consumer electronic equipment is shown at 48.

Beginning with the control circuit 60, a first processor or CPU 80 is attached to a bus 82, to which random access memory 84 and programmable nonvolatile random access memory 86 are attached. The first processor includes an input/output (I/O) module 88 that provides an I/O bus 90 to which an RF communication module 92 and consumer electronic product interface 94 are attached. The consumer electronic product interface 94, in turn, couples to the remaining circuitry of the consumer electronic equipment 48. The radio frequency communication module 92 includes an antenna 40 and is designed to communicate with a corresponding communication module associated with the remote control unit 20.

The remote control unit 20 has a second processor 96 with associated bus 98, random access memory 99 and nonvolatile programmable random access memory 100. The processor 96 also has an I/O module 102 that supports an I/O bus 104 to which a variety of sensors and other devices may be attached. Attached to the I/O bus 104 is the RF communication module 106 that communicates with its counterpart module 92 of the control circuit 60. The display illumination device 108 is also coupled to the I/O bus 104 so that the backlighting can be switched on and off to render any backlit graphical elements on the touchpad visible or invisible. A tactile feedback annunciator/speaker 110 is coupled to the I/O bus. The annunciator/speaker may be activated to produce tactile feedback (vibrations) as well as audible tones.

As previously discussed, the remote control unit includes an assortment of different sensors. These include the touchpad or touchpads 22, a button pad membrane switch assembly 112, accelerometer 114 and capacitive sensors 36. The button pad membrane switch assembly may be physically disposed beneath the touchpads so that pressure upon the touchpad will effect a switch state change from off to on. If desired, the button pad membrane switch assembly 112 may employ pressure-sensitive switches that can register a range of pressures, as opposed to a simple on/off binary state.

Because the remote control unit is designed to sit on the coffee table when not in use, a battery power supply is preferred. Thus, the power supply 200 includes a removable battery 202 as well as a power management circuit 204. The power management circuit supplies power to the second processor 96 and to all of the modules within the remote control unit requiring power. Such modules include all of the sensors, display illumination, and speaker/annunciator components attached to the I/O bus 104. If desired, an RFID tag 206 may be included in the remote control unit circuitry. The RFID tag can be used to help locate the remote control from the control circuit 60 in the event the remote control unit is lost.

Further Implementation Details of Preferred Embodiments

The Touchpad Sensor

The touchpad sensor can be segmented to provide several different intuitive zones of interaction. The touchpad is also clickable by virtue of the button pad membrane switch assembly located beneath or embedded within it. The clickable touchpad can register pressure information and react to pressure (both mechanically and electrically) by sending a specific signal while providing sufficient haptic feedback to the user such as through vibrations and sounds via the annunciator/speaker 110. The touchpad allows for the use of at least two contact points simultaneously. (e.g., two finger input) such as one contact point per side of the pad. The touchpad can be viewed as divided in two along a medial line (e.g., separating the right and left sides of the touchpad when held in a landscape orientation). The touchpad can thus be constructed using two single-position registering touchpads mounted side by side, or one single multi-touch touchpad with the ability to register with equal precision (two points of contact at the same time).

Physical Buttons

Although not required in all embodiments, the remote control unit may have a complement of physical buttons. In this regard, four buttons 32-35 have been illustrated in FIGS. 1a and 1b. These physical buttons may be implemented using the same button pad membrane switch assembly 112 (FIG. 3) embedded beneath the touchpad. The physical buttons, like the context-dependent virtual buttons on the touchpad surface, can be backlit to reveal button function names.

Redefining Regions of Interaction

To allow for natural operation, the remote control unit uses its pattern recognition system to interpret the sensory data. Included in the sensory data are inputs from the accelerometer or accelerometers and the capacitive sensors placed around the periphery and the bottom of the case. The user will naturally turn the remote control unit in his or her hands to best accommodate what he or she is trying to accomplish. The pattern recognition system interprets how the user is holding the remote control unit and redefines these zones of interaction so that they will appear to be at the same place, no matter how the remote is oriented. For instance, the remote control unit can be used with one or two hands, and in both landscape and portrait orientation. The pattern recognition system can discriminate the difference and will automatically redefine the zones of interaction so that the user can perform the most probably operations in the easiest manner for that user. The zones of interaction include, for example, different zones within the touchpad. Different regions of the touchpad may be dedicated to different functions or different user manipulation styles. In addition, the remote control unit itself can be manipulated into different virtual "zones of interaction" by employing different gestures with the remote in mid-air, such as a quick flick of the wrist to change channels.

Power Management

The presently preferred embodiment is contemplated for very low power consumption. For example, the remote control unit may run on a single AA or AAA battery or batteries for approximately one year. With currently available technology, the wireless circuitry associated with RF modules consumes more power than the touch sensors; and the accelerometers and actuators consume less power than the touch sensors. For this reason, the power management circuitry 204 places the wireless circuitry in a sleep mode (or turned off altogether) after a short period of time after the remote control unit is no longer being used (e.g., 30 seconds). The touch sensors will then be placed in sleep mode (or turned off) after a somewhat longer period of time (e.g., 2 minutes). This will allow turning on the wireless circuitry again (in case the user touches the surface of the touchpad or picks up the unit within two minutes). The accelerometers are put into a low power mode where the circuitry checks the accelerometer status at a much lower rate than the normal accelerometer refresh rate. In this regard the normal refresh rate might be on the order of 50 Hz whereas in the low power mode the refresh rate might be in the order of 1 Hz, or even 0.1 Hz. The power management circuitry 204 would implement a turn on sequence that is essentially the reverse of the turn off sequence, with the accelerometer refresh rate being increased to full rate first, followed by reactivation of the touch sensors and finally by activation of the wireless circuitry. In the sleep mode, the RF modules may periodically be awakened, to check to see if there are any pending messages from the control circuit 60.

In the presently preferred embodiment, the remote control unit does not have a dedicated power-on button, as this might be a potential source of user confusion as to whether such button powers on the remote control unit or the television. Thus, the pattern recognition system is used to handle power-on in an efficient manner. The remote control unit turns on when the user first picks it up. For this reason, the system first checks the lower resolution acceleration data to determine if the remote has been moved. If so, the capacitive sensors are next energized to determine if the remote is actually being held (as opposed to simply being inadvertently pushed or moved when resting on the coffee table). If the pattern recognition system determines that the remote control unit is being held, then next the touchpads and finally the wireless circuitry are activated.

Alternatively, power-on can be triggered by a specific gesture, such as shaking the remote control unit. More complex power-on operation can also be utilized, for example, to enforce parental control as discussed above in connection with parental blocking features.

The pattern recognition system will likewise detect when it is time to turn the remote control unit off by detecting inactivity, or if detecting that the television has been turned off. This latter event would be detectable, for example, by information communicated via the RF modules.

Remote Finder

The control circuit 60, associated with the consumer electronic equipment, may include a button that will send a remote location message to the remote control unit. The user would push this button if the remote control unit has gotten misplaced. The control circuit would then periodically send a tell-me-where-you-are signal to the remote via RF. When the remote control unit's RF module next wakes up and finds the wake up signal, it will activate the haptic feedback system (e.g., speaker/annunciator 110) causing the unit to make sound and/or vibrate and optionally use the display illumination circuitry 108 to turn the backlighting on. In addition, if desired, the remote control unit and the control circuitry can use RF ranging functionality to measure the distance between the remote control unit and the control circuit. This information has been used to display the distance on the display 50, or even present a picture of the room with highlighted areas identifying where the remote control unit could be. Alternatively, the RFID tag 206 may be used, allowing the precise location of the remote control to be displayed on the display screen 50.

Tight Coupling Between Remote Control System and On-Screen User Interface

As illustrated by the previously discussed example regarding parental control, the remote control system is able to capitalize on its tight coupling with the on-screen information. The on-screen information, such as instructions on how to deactivate the parental blocking feature, may be stored in the programmable random access memory 86 of the control circuit (FIG. 3) and may then be projected onto the display 50 as an overlay upon the presently viewed program. First, by displaying information to the user on the display screen, the user does not need to look at the remote control unit in order to operate it. If the user needs to enter input, such as a spelled word, an overlay image of a keyboard may be presented and the user can navigate to the desired keys by simply manipulating the touch screen while watching a cursor or cursors (one for each finger) on the displayed overlay keyboard. If desired, the remote control system circuitry can also obtain program guide information and the display overlay can then allow the user to select which programs to view or record by simply manipulating the touch screen.

One can better understand the effectiveness of the remote control system by considering where the functionality of the system has been placed. By tight integration with the display screen, the remote control system can use the display screen, with its high resolution graphics capability, to provide an unlimited amount of visual information to the user which would be virtually impossible to provide through a set of dedicated buttons as conventional controllers do. The rich collection of diverse sensory inputs allows the user to adopt many different, and even redundant, ways of communicating the user's desires to the system. Interpretation of the diverse collection of sensory inputs by the pattern recognizer handles much of the complexity of converting the user's gestural and touch commands into message meaning data that correlate to functions that the consumer electronic equipment can perform. The resulting division of labor produces a control system that provides both a very high, visually engaging information content to the user regarding his or her control system choices, with an equally rich collection of gestural and touch commands that the user can employ to get his or her message across to the control system. Compare this to the conventional push button remote control that requires one button, or a sequence of buttons, to be pressed for each desired function, with the added inconvenience that the user must look at the remote control in order to find the desired button to push.

From the foregoing, it will now be appreciated that the description and broad teachings of the present disclosure can be implemented in a variety of ways. Therefore, while this disclosure has been described with particular examples thereof, the true scope of the invention should not be so limited, as other modifications will become apparent to those of skill in the art upon study of the drawings, specification and following claims.

What is claimed is:

1. A remote control system for consumer electronic equipment having a display screen, comprising:

a control circuit coupled to said consumer electronic equipment for controlling operation thereof;
a remote control unit having a handheld case and plurality of sensors disposed within said case, including:
(a) at least one touchpad responsive to manipulation by a user's fingers;
(b) at least acceleration sensor responsive to movement of the remote control unit;
(c) a case perimeter sensor that discriminates which parts of the case are in contact with the user's body;
(d) at least one pressure sensor responsive to pressing forces upon a predetermined region of the touchpad; and
(e) an RF signal sensor responsive to radio frequency signals transmitted from said control circuit;
said remote control unit being configured to produce a sensory input message containing information extracted from said plurality of sensors;
a pattern recognizer receptive of said sensory input message;
said pattern recognizer including a trained model adaptable through interaction with the user and configured to classify the received sensory input message according to a predetermined recognition scheme to generate message meaning data;
said pattern recognizer being further configured to classify the received sensory input message based on context information extracted from knowledge of what is being displayed on the display screen of the electronic equipment;
control logic responsive to said message meaning data to generate at least one command that is communicated to said control circuit;
wherein said remote control unit includes power management system and wherein said control logic generates at least one command that is communicated to said power management system to alter power management system behavior based on said message meaning data; and
wherein said control circuit having memory for storing control system operation information and wherein said control circuit selectively provides said operation information to the consumer electronic equipment for presentation to the user wherein said control circuit selectively provides said operation information to the consumer electronic equipment in accordance with the message meaning data generated by said pattern recognizer;
wherein said power management system performs:
placing of said plurality of sensors included in said remote control unit, into a sleep mode;
detecting movement of said remote control unit by waking said acceleration sensor up in the sleep mode;
determining whether or not said remote control unit is held by the user, by waking said case perimeter sensor up when the movement of said remote control unit is detected; and
releasing the sleep mode when the detecting detects that said remote control unit is held by the user.

2. The remote control system of claim 1,
wherein said power management system releases the sleep mode, by waking said at least one touchpad up and then waking said RF signal sensor up, when the detecting detects that said remote control unit is held by the user.

3. A remote control system for consumer electronic equipment having a display screen, comprising:
a control circuit coupled to said consumer electronic equipment for controlling operation thereof;
a remote control unit having a handheld case and plurality of sensors disposed within said case, including:
(a) at least one touchpad responsive to manipulation by a user's fingers; and
(b) at least one additional sensor selected from the group consisting of:
(1) acceleration sensors responsive to movement of the remote control unit;
(2) case perimeter sensors that discriminates which parts of the case are in contact with the user's body;
(3) pressure sensors responsive to pressing forces upon a predetermined region of the touchpad; and
(4) RF signal sensors responsive to radio frequency signals transmitted from said control circuit;
said remote control unit being configured to produce a sensory input message containing information extracted from said plurality of sensors;
a pattern recognizer receptive of said sensory input message;
said pattern recognizer being configured to classify the received sensory input message according to a predetermined recognition scheme to generate message meaning data;
said pattern recognizer being further configured to classify the received sensory input message based on context information extracted from knowledge of what is being displayed on the display screen of the electronic equipment;
control logic responsive to said message meaning data to generate at least one command that is communicated to said control circuit;
wherein said touchpad is divided into plural separate regions of interaction, such that each region of interaction is interpreted to have a different meaning by said pattern recognizer;
wherein said at least one additional sensor comprises a case orientation sensor capable of differentiating between portrait orientation and landscape orientation; and
wherein said regions of interaction are remapped onto different locations within the touchpad based on case orientation;
wherein said at least one additional sensor further comprises the at least one acceleration sensor and at least one of the case perimeter sensors,
said pattern recognizer redefines a zone of interaction, by interpreting how the user is holding said remote control unit based on information extracted from said at least one additional sensor.

4. The remote control system of claim 3,
wherein said pattern recognizer interprets whether the user is holding said remote control unit with one hand or with two hands.

* * * * *